United States Patent
Jones et al.

(10) Patent No.: US 11,455,388 B1
(45) Date of Patent: Sep. 27, 2022

(54) SYSTEM AND METHOD FOR END-TO-END DATA TRUST MANAGEMENT WITH REAL-TIME ATTESTATION

(71) Applicant: Weeve.Network, Berlin (DE)

(72) Inventors: Marcus Jones, Berlin (DE); Michael-Maria Bommer, Berlin (DE)

(73) Assignee: WEEVE.NETWORK, Berlin (DE)

( * ) Notice: Subject to any disclaimer, the term of this patent is extended or adjusted under 35 U.S.C. 154(b) by 0 days.

(21) Appl. No.: 17/574,559

(22) Filed: Jan. 13, 2022

Related U.S. Application Data

(60) Provisional application No. 63/179,938, filed on Apr. 26, 2021.

(51) Int. Cl.
  *G06F 21/53* (2013.01)
  *G06F 21/72* (2013.01)
  *G06F 21/75* (2013.01)
  *G06F 21/56* (2013.01)

(52) U.S. Cl.
  CPC .......... *G06F 21/53* (2013.01); *G06F 21/566* (2013.01); *G06F 21/72* (2013.01); *G06F 21/755* (2017.08)

(58) Field of Classification Search
  CPC ......... G06F 21/53; G06F 21/52; G06F 21/566
  See application file for complete search history.

(56) References Cited

U.S. PATENT DOCUMENTS

| | | | |
|---|---|---|---|
| 8,930,705 B1 | 1/2015 | Ghose et al. | |
| 10,033,756 B1 | 7/2018 | Rangarajan et al. | |
| 11,146,572 B2 * | 10/2021 | Gupta | H04L 63/145 |
| 2004/0133777 A1 * | 7/2004 | Kiriansky | G06F 21/554 |
| | | | 713/166 |
| 2005/0132122 A1 | 6/2005 | Rozas | |
| 2013/0298244 A1 * | 11/2013 | Kumar | G06F 21/51 |
| | | | 726/25 |
| 2019/0065406 A1 | 2/2019 | Steiner et al. | |
| 2019/0138729 A1 * | 5/2019 | Blundell | H04L 9/3234 |
| 2020/0313861 A1 * | 10/2020 | Troia | H04L 9/0866 |
| 2021/0256113 A1 * | 8/2021 | Stott | G06F 21/64 |
| 2022/0058293 A1 * | 2/2022 | Troia | G06F 21/72 |

* cited by examiner

*Primary Examiner* — Ponnoreay Pich
(74) *Attorney, Agent, or Firm* — Galvin Patent Law LLC; Brian R. Galvin

(57) ABSTRACT

A system and method for real-time attestation which attests to the untouchability of processors from external influences. The system and method comprise a security mechanism that extracts information about a program's full-control execution path and then validates that information with a highly isolated guard process during runtime, which is running in a trusted environment. This trusted guard application also acts as a remote attester client and sends the currently running control flow graph to a remote attestator server on demand.

20 Claims, 14 Drawing Sheets

SYSTEM AND METHOD FOR END-TO-END DATA TRUST MANAGEMENT WITH REAL-TIME ATTESTATION

CROSS-REFERENCE TO RELATED APPLICATIONS

Priority is claimed in the application data sheet to the following patents or patent applications, the entire written description of each of which is expressly incorporated herein by reference in its entirety:
63/179,938

BACKGROUND

Field of the Art

The disclosure relates to the field of cybersecurity, and more particularly to the field of firmware/processor security.

Discussion of the State of the Art

Industry 4.0 is on everyone's mind—for many companies, however, the level of innovation associated with the advances of the so-called Industry of Things (IoT) is not readily achievable due to a lack of confidence in the security of the devices that make up the IoT. In this connected world, more and more quality data is going to empower the smart decision-making process of IoT-enabled machines deployed in a factory or various IoT-gadgets deployed in our houses which means until the security of these devices is up to standard, more and more vulnerabilities will be available to hackers.

Therefore, the challenge ahead is now how can the data from such devices be securely delivered and used in a trusted, scalable, and automated way? Industry leaders for low-end embedded devices have failed to bring the best hardware and software security practices widely available on high-end devices down to these IoT-microcontroller devices. This is partly due to the limited resources in microcontrollers, and with so many operating systems and solution stacks, it also leads to a complex and challenging landscape for embedded security. Furthermore, recent IT hacking attacks and the damage from IT security failures have exposed enormous shortcomings across almost all industry domains marking this as a priority among the cybersecurity industry.

Therefore, a holistic system for the attesting of the data is needed, that the data is not subject to any external influence and associated change.

SUMMARY

Accordingly, the inventor has conceived and reduced to practice, a system and method for real-time attestation which attests to the untouchability of processors from external influences. The system and method comprise a security mechanism that extracts information about a program's full-control execution path and then validates that information with a highly isolated guard process during runtime, which is running in a trusted environment. This trusted guard application also acts as a remote attester client and sends the currently running control flow graph to a remote attestator server on demand.

According to a first preferred embodiment, a system for end-to-end data trust management with real-time attestation is disclosed, comprising: a database, wherein the database comprises a plurality of verified control flow hash values; an instrumented firmware comprising at least a plurality of programming instructions stored in a memory of, and operating on at least one processor of, a networked computing device, wherein the plurality of programming instructions, when operating on the at least one processor, causes the computing device to: create a compartmentalized normal operating environment; create a compartmentalized high-privileged operating environment; create a golden control flow hash value from a set of instructions running in the normal operating environment on the processor of the networked computing device; and send the golden control flow hash value to a trusted guard application; a trusted guard application, wherein the trusted guard application is running in the high-privileged operating environment of the networked device; prepare a device-specific cryptographically signed authenticated message with the golden control flow hash; and send the prepared message to a remote attestation server; and a remote attestation server comprising at least a plurality of programming instructions stored in a memory of, and operating on at least one processor of, a computing device, wherein the plurality of programming instructions, when operating on the at least one processor, causes the computing device to: receive a golden control flow hash value from the networked computing device; and validate the integrity of the golden control flow hash against at least one of the pluralities of verified control flow hashes stored in the database.

According to a second preferred embodiment, a method for end-to-end data trust management with real-time attestation is disclosed, comprising the steps of: creating a compartmentalized normal operating environment; creating a compartmentalized high-privileged operating environment; creating a golden control flow hash value from a set of instructions running in the normal operating environment; preparing a device-specific cryptographically signed authenticated message with the golden control flow hash; sending the prepared message securely over a communication network from a first networked computing device; receiving the prepared message over the communication network on a second networked computing device; and validating the integrity of the golden control flow hash against at least one of a plurality of verified control flow hashes stored in a database.

According to various aspects; the system and method further comprises an application programming interface; wherein the trusted guard application and the remote attestation server pass data packets via the application programming interface; wherein the real-time attestation firmware is implemented using container; wherein a failed validation of the latest control flow hash results in at least a notification to administrative personnel; further comprising a user interface that displays real-time attestation data; wherein the golden control flow hash value is generated from all the instructions between two branch instructions; wherein the networked computing device comprises any computing device with a processor that is communicatively coupled to another computing device; further comprising secure messaging establishment protocol; wherein the secure messaging establishment protocol uses a third party mediator to verify network activity.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
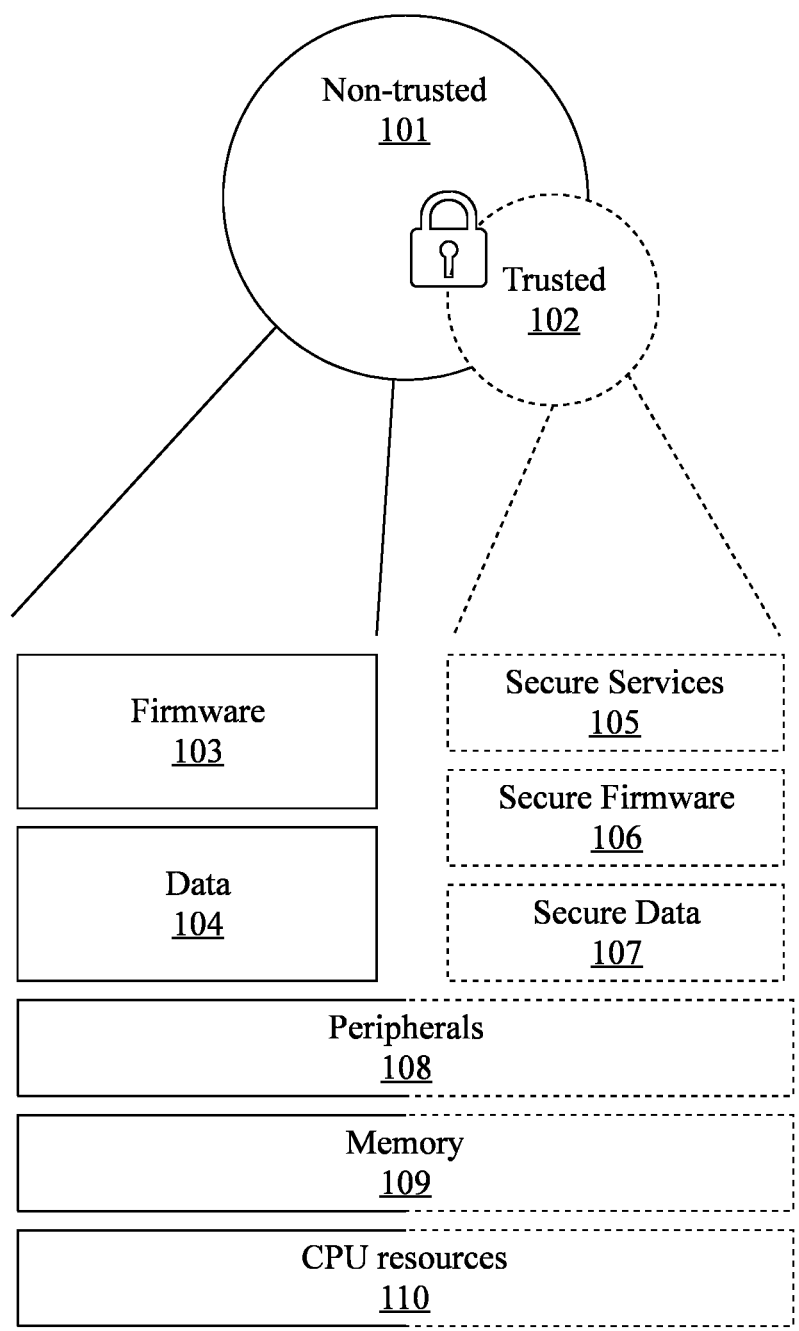
FIG. 1 is a block diagram illustrating an exemplary security architecture for processors, according to one aspect.

The inventor has conceived, and reduced to practice, a system and method for real-time attestation which attests to the untouchability of processors from external influences. The system and method comprise a security mechanism that extracts information about a program's full-control execution path and then validates that information with a highly isolated guard process during runtime, which is running in a trusted environment. This trusted guard application also acts as a remote attester client and sends the currently running control flow graph to a remote attestator server on demand.

The system and method address the integrity of the process running on an IoT device while the data is being used. This process may collect useful data using sensors or executing a data processing step or even executing a business logic in case of an actuator device. Detecting and preventing the software vulnerabilities of the process is the key here.

Almost all low level embedded software and firmware is developed in the C programming language. C's lack of proper boundary checks for intended allocated memory is a source of big security threats. In addition to buffer overflow, C-program suffers from integer-overflow, string-format vulnerability, return address overwrites, etc. There is also a new class of security threats to a C-program such as return-to-libc, and more general return-oriented programming (ROP1 which are very effective against common mitigation techniques such as Data Execution Prevention and code signing. Proper code review with static and dynamic application security tools inadequately reduces the severity of such vulnerabilities. Other techniques in the toolchain such as stack smashing-protection, in the hardware itself like NX-bit set for data segments, during runtime like address space layout randomizations (ASLR) exist but the program is still far from a vulnerability free guarantee. In the context of microcontroller based low-end devices, the most effective mitigation technique of ASLR is not implemented because of practicality to avoid having a run-time loader.

To address C-program vulnerability issues, the system and method detects them at run time. A more privileged isolated guard process that inspects and testifies the behavior of a running C-program (the MCU firmware) is disclosed. The guard process needs to be isolated and more privileged than the normal firmware because if it is part of the same process or similar privilege level as normal firmware, the hacker will be able to hack the guard process as well with exploiting the same vulnerability in normal firmware. Additionally, disclosed is a remote attestation entity that knows in advance all the valid execution snapshots of normal firmware execution, and testifies to these snapshots periodically. A remote server for attestation is anticipated to make the overall system more resilient to attacks, rather than relying on an isolated guard process. The remote server also lets the device fleet manager know the integrity status of the devices.

One embodiment integrates the above described remote runtime firmware attestation product with a Blockchain-powered data economy digital infrastructure. Decentralization of attestation is of great importance, as it reduces data transmission and thus gain a decisive advantage over conventional accounting activities in the cloud with enormous specific capacity. And while decentralization is used in various embodiments, the system and method can also be utilized in other IoT use case deployments without a blockchain component.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 2:
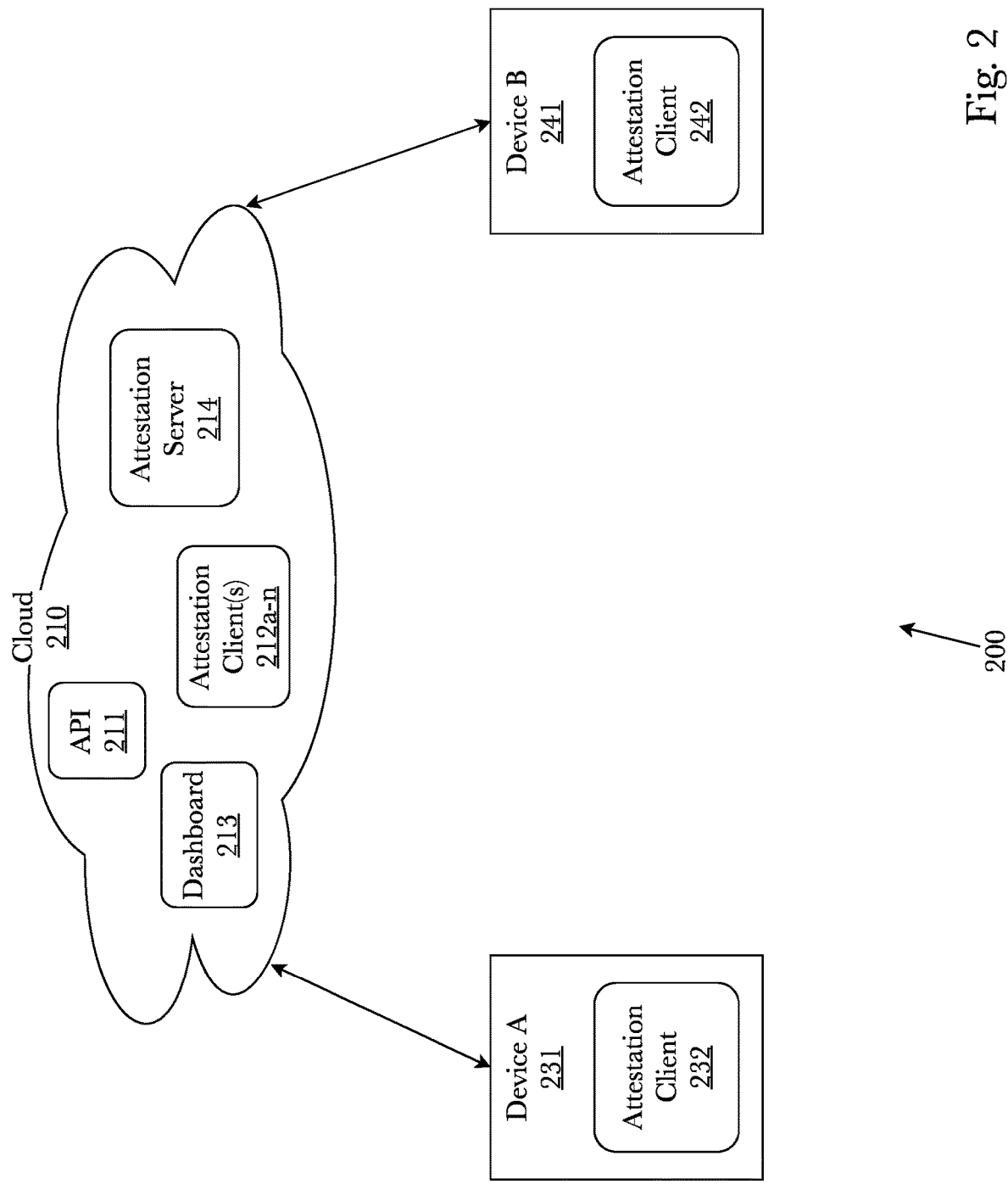
FIG. 2 is a block diagram illustrating an exemplary system infrastructure for a platform for end-to-end data trust with real-time attestation.

FIG. 2 is a block diagram illustrating an exemplary system infrastructure for a platform for end-to-end data trust with real-time attestation 200. A platform for end-to-end data trust with real-time attestation 200 comprises a plurality of cloud services/servers 210 communicatively coupled to one or more attestation clients 232/242 on one or more computing devices 231/241 via an API (application programming interface) 211. Device A 231 and device B 241 represent edge devices which may be any type of computing device, but is more specifically referred to herein as mobile devices, microcontrollers, and devices typically associated with Industry-of-Things devices. The attestation clients 212a-n/232/242 herein refer to code ran at least on the firmware level (i.e., trusted firmware). The attestation clients 232/242 on the edge devices 231/241 may assist or fully perform one or more of the real-time attestation functions disclosed herein. Attestation clients 232/242 may offload (relative to the device) computationally expensive functions to a platform for end-to-end data trust with real-time attestation in the cloud 210 or other remote computing devices. The attestation clients 232/242 in concert with the cloud services 210 provide an improvement of cybersecurity to an entire communication network, as also disclosed in subsequent figures. The attestation clients 212a-n refer to trusted firmware for cloud and gateway devices such as routers, switches, servers, etc.

Users of a platform for end-to-end data trust with real-time attestation 200 may also be presented with a dashboard 213 of information relating to the user's devices and services. This dashboard 213 may be hosted on a webserver, accessed through an API 211, or other communication means known to those in the art.

A secure messaging establishment protocol may be used to operate securely on a communication network used by or incorporated within a platform for end-to-end data trust with real-time attestation 200. A secure message connection may be established by sending a connect message including a digital signature and a trusted certificate, preferably wherein a successful established secure message connection is acknowledged. A third party in the form of a mediating entity manages subscriptions and distributes messages. The mediating entity acts therefore as man-in-the-middle which is isolated from the other components of the communication network, for example by using hardware enabled trusted execution technologies. The isolation of the mediating entity makes sure that even if the remainder of the communication network and partial components of the mediator itself are compromised, an attacker neither can change the message flow of the mediating entity nor learns sensitive data including cryptographic key material, subscriptions, or the like.

The secure messaging protocol may comprise the following twelve subprotocol messages:

1. CONNECT: This message initiates the secure messaging protocol.

2. CONNECTACK: This message acknowledges the initiation of secure messaging.

3. PUBLISH: This message sends a publish message in a private and authenticated way. The purpose of the message is to publish content for a topic. It contains the topic name, content and desired quality of service, abbreviated as the message pubm.

4. PUBLISHACK: This message acknowledges the reception of the publish message with a flag pflag. If pflag =0, it is guaranteed that the message was delivered at most one time. If pflag =1, it is guaranteed that a message was delivered at least once to the receiver. If pflag =2, then it is guaranteed that the message was delivered only once. If pflag =$\perp$, then a transmission error occurred and an error code may be attached.

5. PUBLISHRECEIVED: This publish received message is the response to a PUBLISHACK where the pflag =2. This guarantees that a message is received only once.

6. SUBSCRIBE: This message sends a subscription message in a private and authenticated way. The purpose of the message is to subscribe to a topic or set thereof. The subscription request comprises a list of topic name and desired quality of service, abbreviated by message unsubm.

7. SUBSCRIBEACK: This message acknowledges the reception of the subscription message with a flag uflag. If uflag =0, then it is guaranteed that the message was delivered at most one time. If uflag =1, it is guaranteed that a message was delivered at least once. If uflag =2, then it is guaranteed that the message was delivered only once. If uflag =⊥, then an unsubscription error occurred and an error code may be attached.

8. SUBSCRIBERECEIVED: This subscribe received message is the response to a SUB-SCRIBEACK where the uflag =2. This guarantees that a message was received only once.

9. UNSUBSCRIBE: This message sends an unsubscribe message in a private and authenticated way. The purpose of the message is to unsubscribe from a topic or a list thereof. The unsubscription request comprises an arbitrary number of topics the sender wishes to unsubscribe from.

10. UNSUBSCRIBERECEIVED: This unsubscribe received message is the response to a SUBSCRIBEACK where the sflag =2. This guarantees that a message was received only once.

11. UNSUBSCRIBEACK: This message acknowledges the unsubscription message with a flag uflag. If sflag =0, then it is guaranteed that the message was delivered at most one time. If sflag =1, it is guaranteed that a message was delivered at least once. If sflag =2, then it is guaranteed that the message was delivered only once. If sflag =⊥, then a subscription error occurred and an error code may be attached.

12. DISCONNECT: This final message indicates that an initiator I disconnecting cleanly from the network.

This enables an easy set-up of the secure connection between two entities via said connect message. A secure message connection may be based on encrypting and decrypting of messages using a symmetric-key authenticated encryption scheme.

In short, the end-to-end security is provided by securing the control flow code of each device within a given network. For example, as data traffic travels from device A 231 through a series of network devices to device B 241, the remote attestation server 214 periodically verifies the integrity of the processor operations of each device generating or facilitating the transfer of that data on the network.

Figure 3:
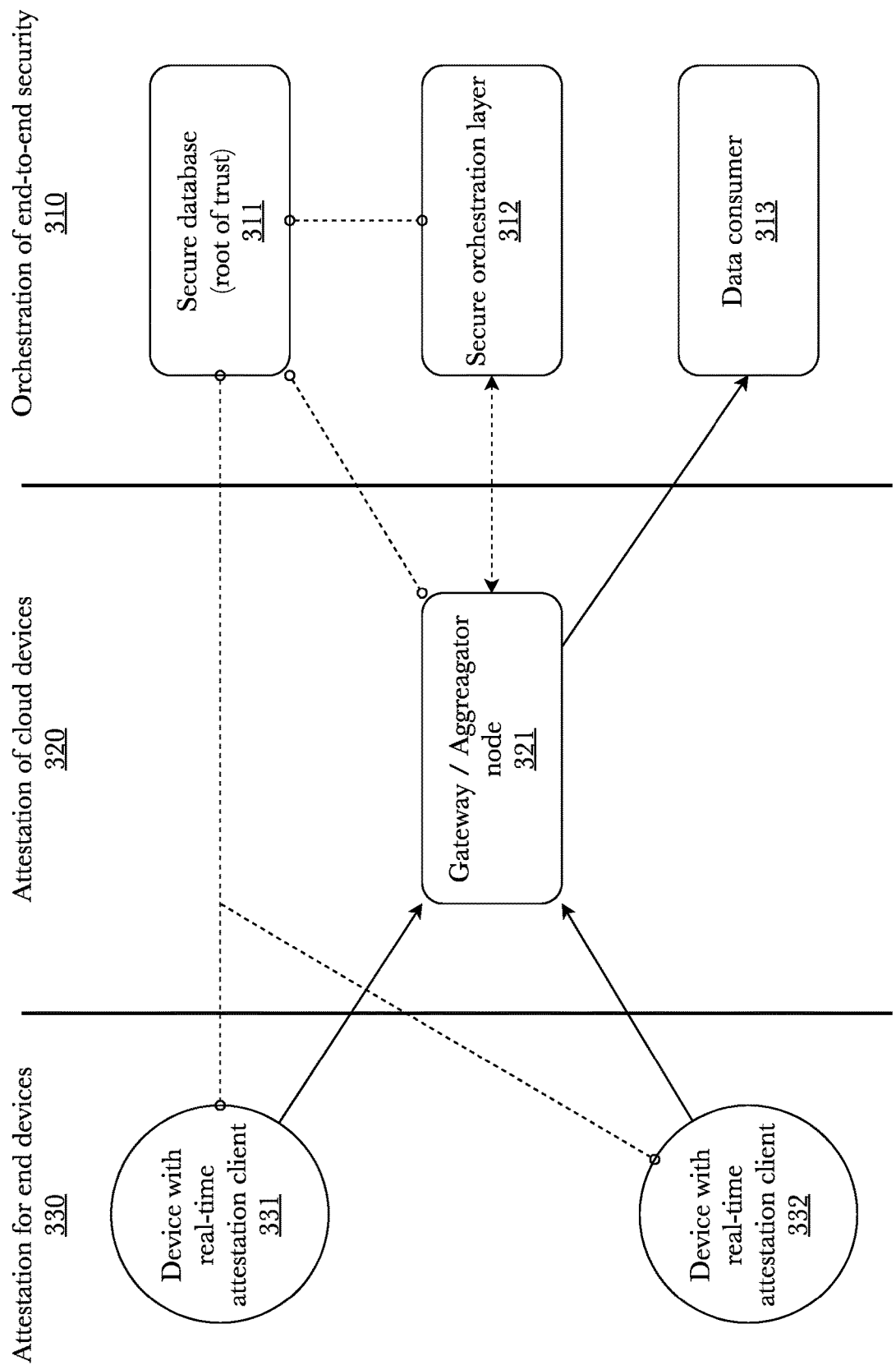
FIG. 3 is a block diagram illustrating an exemplary system architecture for a platform for end-to-end data trust with real-time attestation.

FIG. 3 is a block diagram illustrating an exemplary system architecture for a platform for end-to-end data trust with real-time attestation. Various aspects of a platform for end-to-end data trust with real-time attestation are a dashboard, database, and other types of business systems relevant to data consumers 313. This is because IoT data has no value unless it can be turned into information and intelligence. The security and trust of IoT data is paramount and as such, orchestrating and securing of gateways and devices is crucial 310. The developed security framework of the IoT concepts comprises of remote attestation, onboarding, monitoring and device reliability of edge devices 330/331/332 and cloud devices 320/321. The security framework may take the form of a cloud-based microservice architecture with role-based access control, according to one embodiment 312. The result being an unchangeable and trusted root of trust 311 that scales by orchestrating devices and gateways. Within the root of trust 311, the identities, certificates, and keys for each identity and key are stored. A storage solution for the set of golden hashes in the database may be implemented on many different types of databases known throughout the art, however, blockchain technologies are presented as one preferred type.

Attestation for the end devices 330 comprises the data from devices 331/332 such as sensors and microcontrollers of a "normal world" jumping via trampolines to the "secure world", then validated, and attested for correctness. The trampolines create a trustworthiness in the produced data with the help of real-time attestation. A secure zone is created on the devices 331/332, in which the data is checked for correctness and a trust base for the user is realized by conveying the assurance that the data has not been manipulated from the outside.

Figure 5:
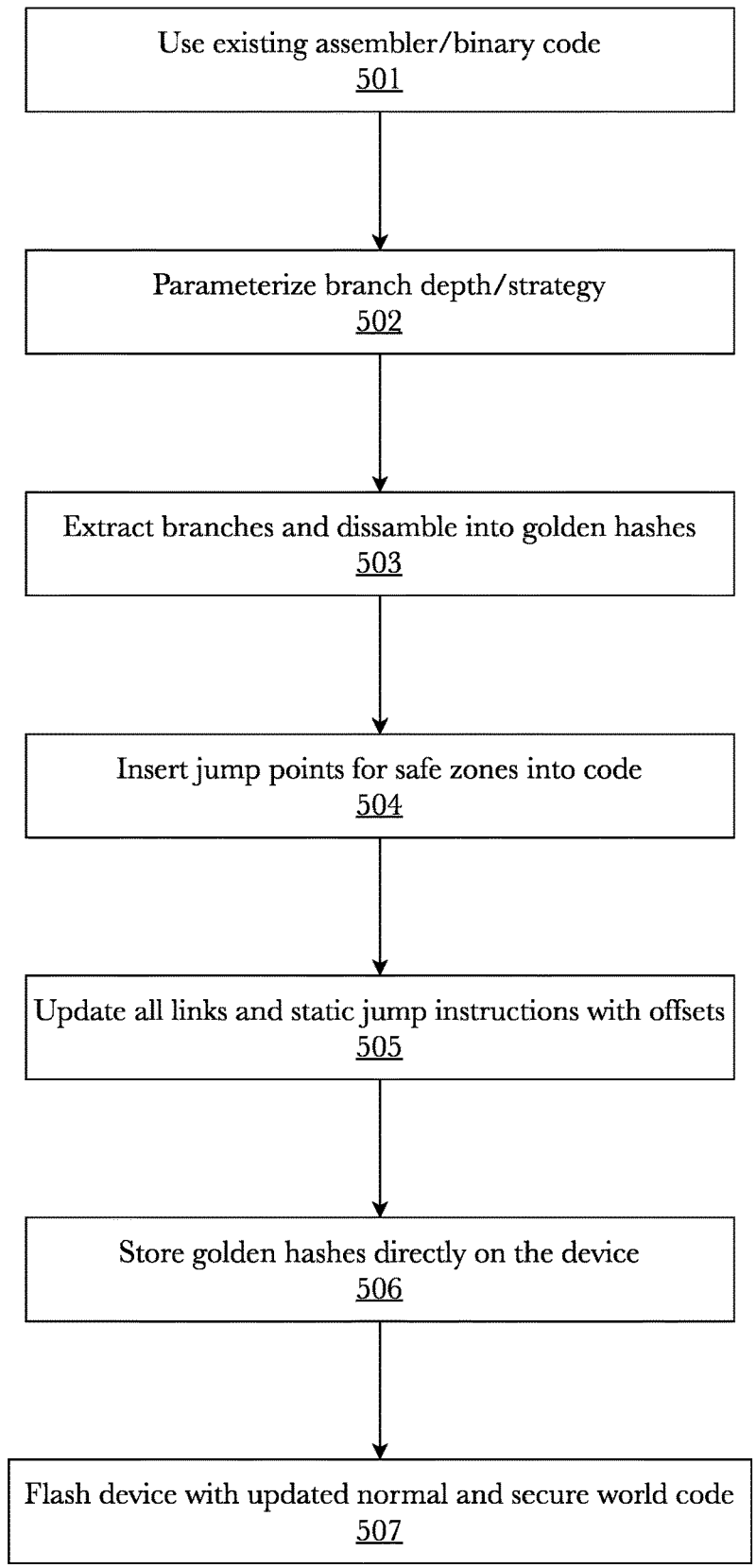
FIG. 5 is a flow diagram illustrating an exemplary method for real-time attestation, according to one aspect.

The method of real time attestation (See FIG. 5) comprises using the existing assembler code or compiled binary code 501; parameterization of branching depth/strategy 502; extraction of the branches and disassembly of these into golden hashes 503; inserting jump points for safe zones into the code 504; updating all link and static jump instructions with offsets 505; storage of the Golden Hashes directly on the device 506; and flashing the device with updated code of the "normal world"" and the "secure world" 507.

In order to generate a better understanding of where the attestation begins by validating the data, the starting point of each software creation is first described. Each software is written by a programmer via the application of a programming language. With the help of a compiler, this code is translated into the machine binary code. The platform starts with the assembly code of the architecture and attests to the immutability of this written code by integrating trampolines. These trampolines serve as a springboard for all data transported from the "normal world" to the "secure world".

Figure 8:
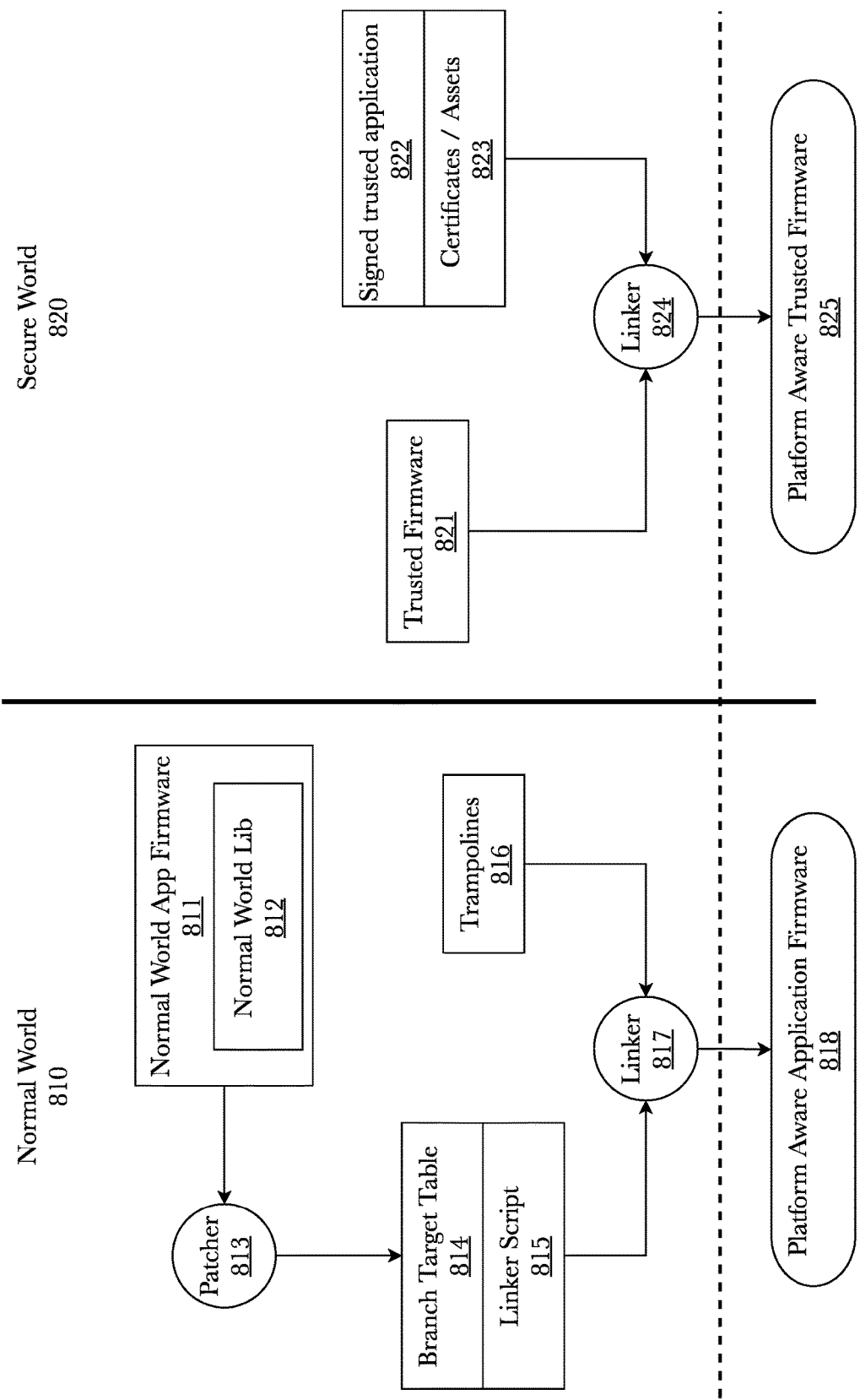
FIG. 8 is a block diagram illustrating an exemplary system architecture for a data trampoline, according to one aspect.

Trampolines are described further in FIG. 8, wherein a platform for end-to-end data trust with real-time attestation transfers data from a "normal world" 810 to a "secure world" 820 environment. A patcher 813, analyses a normal world 810 firmware binary image 811/812. All control flow assembler instructions are replaced with a BL instruction (BL corresponds to a function call in ARM assembly). The target address of this BL instruction is a routine written in ARM assembly. All assembly routines are dependent on the type of control flow instruction it is replacing, in other words, every ARM assembly control flow instruction type has a routine. These routines are called trampolines 816.

A table 814 with records as a tuple {sourceAddress, originalDestinationAddress} is also generated. Since all the control flow destinations in the original firmware are modified, this table 814 contains a very crucial piece of information on original control flow destination addresses. This table will be used by the trampolines 816. This control flow branch table is generated in the form of a C-source file 815/817/818.

The trusted firmware 821 must be built so that the control-flow branch table 814 generated in the above paragraph can be linked to normal world firmware 811 and available at run time. This firmware is protected by the platform for end-to-end trust and real-time attestation and ready to be downloaded on the device 823/824/825.

The trusted application 822 also needs to be flashed to the device. Note that the trusted application 822 is independent of normal world firmware and instrumentation process. If normal world firmware is bug-fixed and remotely upgraded by the user, there is no need to change the trusted application.

Figure 9:
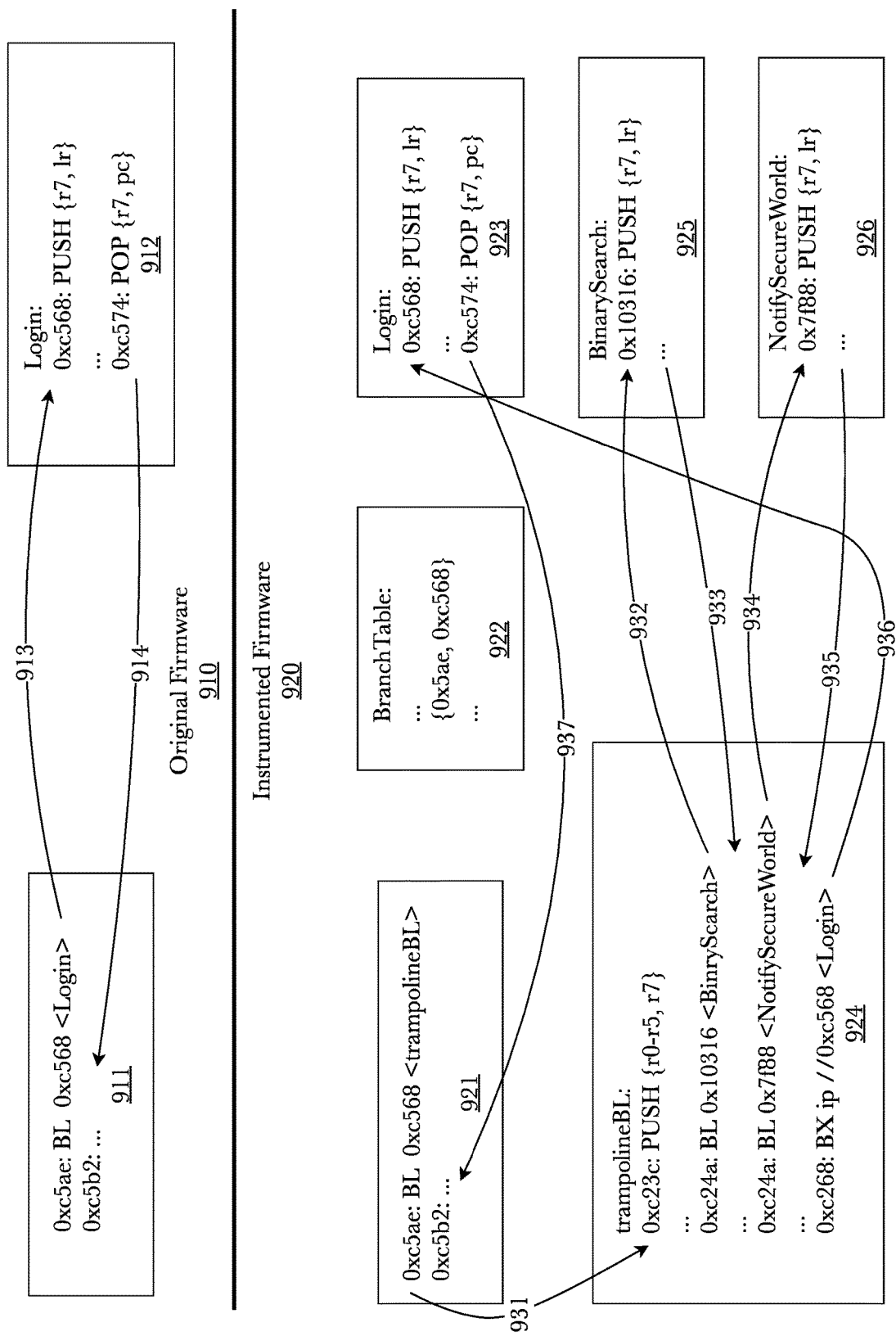
FIG. 9 is a flow diagram illustrating an exemplary method for implementing a data trampoline, according to one aspect.

While the FIG. 8 illustrates one component of an attestation client and the necessary steps to generate an instrumented firmware so that original application firmware is made aware of the trusted application, and also made to pass control flow information to the trusted application, the following is a flow diagram (FIG. 9) of a how a C-function call is protected at runtime. The following example visualizes a service that runs on the C programming language and protected by a platform for end-to-end data trust with real-time attestation.

In original firmware 910 a Login( )function 911-914 is called. Now when this firmware is patched or instrumented using a platform for end-to-end data trust with real-time attestation 920, the call to login is replaced with another routine, namely trampolineBL( )921. Since the original binary is modified, the platform has already made available the original source and destination addresses in BranchTable 922. Component 926 is the trusted application, NotifySecureWorld( )is an API in the trusted application.

In a first step 931, when the normal world process runs the instrumented firmware and a control flow instruction is executed, it jumps to trampolines routine TrampolineBL( )instead of original Login( )function. TrampolineBL( )saves the current processor state. The current processor state also provides the information from which sourceAddress 0xC5AE the Trampoline routine is called. In a second 932 and third step 933, using sourceAddress 0xC5AE, TrampolineBL( )searches(BinarySearch( )) the BranchTable to find the originalDestinationAddress 0xC568. According to a fourth 934 and fifth step 935, trampoline TrampolineBL( )passes this control flow information tuple {sourceAddress, originalDestinationAddress} {0xC5AE, 0xC658} to the Trusted Application, and calls to NotifySecureWorld( ) The trusted application cumulatively hashes the above control flow information. In a sixth 936 and final seventh step 937, after returning from the trusted call, a call to original intended function Login( )(Branch BX to address 0xC568) is made. The aforementioned steps 931-937 are run for all control flow branches, i.e., the function calls-returns, if-else, goto block, and loops of a C-program of the binary 910-926.

With the help of Run Time Profiler Tool, iterations with varying input to the whole program with fair coverage allows a set of golden hashes to be captured and stored. A single golden hash represents a valid execution flow path of "the whole program for a given input", not to be confused with the hash of a single control flow information tuple {sourceAddress, originalDestinationAddress}.

Referring back to FIG. 3, attestation for cloud devices 320, communication process units are known in the IoT world as aggregators, network nodes, or gateways 321. Gateways are primarily localized on-premises. Application processors that communicate with the end devices via communication process units are also connected to or are part of cloud infrastructures. Additionally, the details disclosed herein about attestation on ARM processors may be extended to application processors to ensure control flow integrity of the data using the extended TLS protocol, the MQTTS protocol, and containerization. The attestation of the containerization with which the data is transported may be accomplished using Docker technology and using the security protocols TLS and the protocol MQTTS specifically such that attestation may be extended to any processor.

Compared to other solutions that only allow static linking, the claimed invention offers integrity-protected, dynamic lining in the form of enclaves. This allows a variety of applications to run without modification. To protect applications and data in real time, a platform for end-to-end data trust with real-time attestation uses an isolated storage area, a so-called secure enclave, to run an application in a trusted execution environment (TEE). A secure enclave is protected by locked hardware in the CPU that protects the processed data from attacks and attempts to access it outside the TEE, and it is difficult for attackers to decrypt private data without legitimate permission, even if they have physical access to the infrastructure.

Secure enclaves may be thought of as kind of boxes where sensitive data and applications can be executed without worrying about security, integrity, and confidentiality. Even if the attacker has root access or the infrastructure is compromised, the sensitive data remains secure. Examples of TEEs include ARM's TrustZone, AMD's Secure Encrypted Virtualization (SEV), and Intel's Trusted Execution Technology (TXT) and Software Guard Extensions (SGX).

The MQTTS describes a secure method for the message Queuing Telemetry Transport, i.e., a transmission of telemetry data in the form of messages between machine to machine, ensured by a dynamic real-time attestation. This provides a secure message connection between the initiating entity and the mediating entity. A publishing message is provided to the Mediating Entity that is authenticated and/or encrypted and contains topic information and content associated with the information.

A secure message connection is established by sending a connection message with a digital signature and a trusted certificate, preferably confirming a successful secure message connection and/or where a secure message connection is based on the encryption and decryption of messages using a symmetric key authenticated encryption scheme.

For this purpose, a mediating entity (ME) is implemented, which includes a trusted execution environment (TCE) and is modified accordingly to perform the following steps: receive a message for a "Responding Entity" (RE) of the communication network from an initiating entity (IE); check whether the IE has permission to communicate with said "Responding Entity" (RE), based on a list of subscriptions that represent topics for the subscription and that is securely stored in the Trusted Execution Environment (TCE); establish a secure data exchange between the Mediating Entity (ME) and the RE using its own TCE and a TCE of the RE; send at least the contents of the message, preferably the message, to the RE over the secure message connection; receive a result for the topic of processed messages over the secure message connection from the RE; and publication of the obtained result to the initiating entity.

Figure 4:
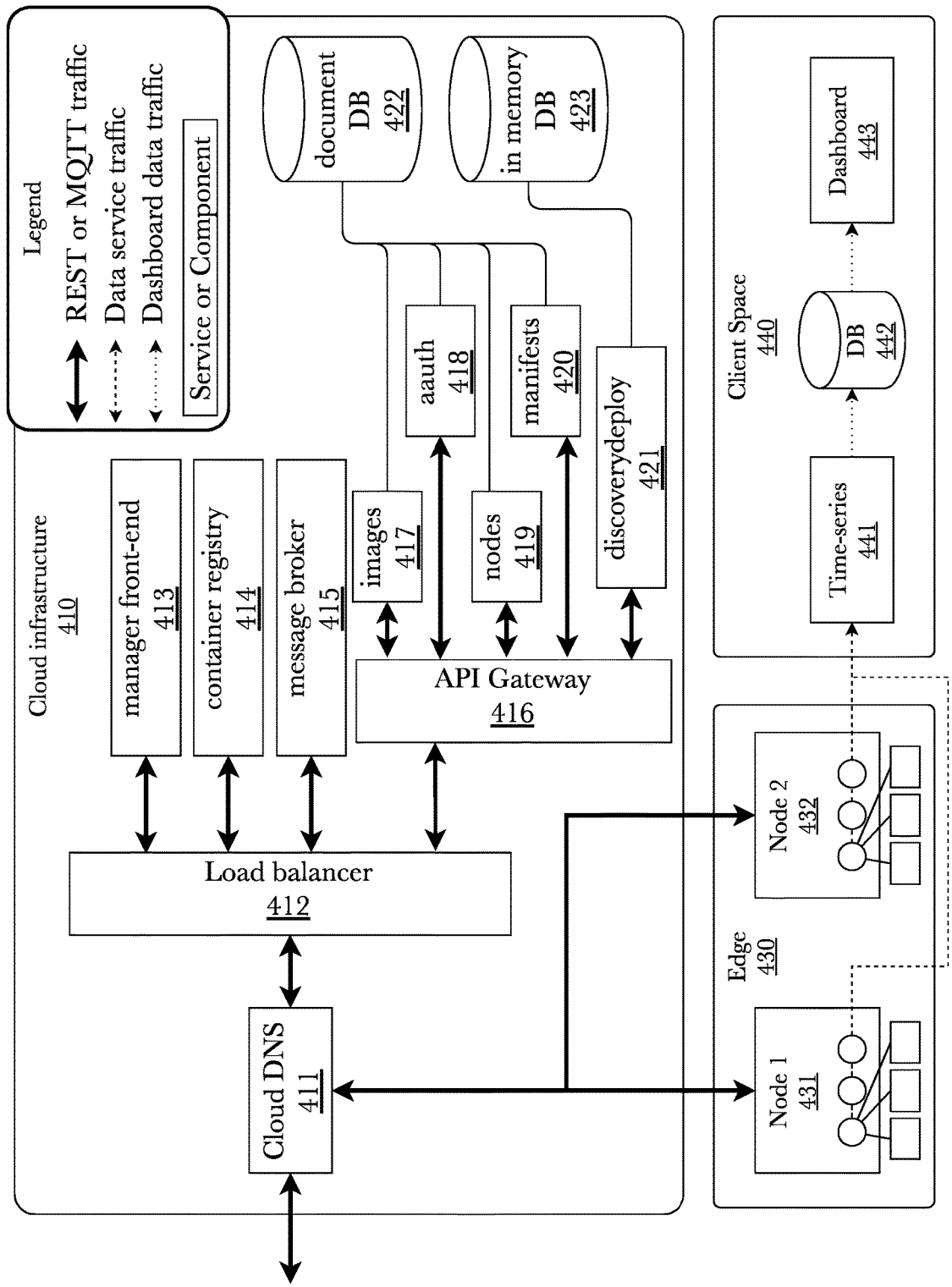
FIG. 4 is a block diagram illustrating an exemplary system architecture for data orchestration.

FIG. 4 is a block diagram illustrating an exemplary system architecture for data orchestration. According to one embodiment, the orchestration of end-to-end security 310 comprises nodes 431/432 in the edge 430 that are implemented to allow the data pipeline to run on Edge devices. To do this, all data pipeline services are running on multiple architecture platforms (x86, ARM, etc.). Furthermore, container runtime values may be used in implementation.

A platform for end-to-end data trust with real-time attestation may provide an update or, for example, a correction on several resources at the same time within a very short period of time to attest to the security of the data guaranteed in real time. In addition, a configuration management tooling is recommended for the edge nodes, which is able to automatically provide images on the edge nodes. For this, an automated image machine builder may be used.

A microservice backend is implemented, which is designed so that all services will communicate with only one component. To implement this, appropriate rules may be defined. A gateway and a service mesh 416-423 comprises the following two functions: an API Gateway 416 that manages data traffic on OSI Layer 7 (routing by HTTP header/URL), and a Services Mesh that manages data traffic on OSI Layer 3 (routing by IP address).

Each user may be assigned its own subdomain such as "factory-name.network". This subdomain will allow access to a user dashboard 443. The dashboard 443 will also be connected to the user's time-series database 441/442. To ensure the user's individual services and infrastructure, access-restriction is desired in the client space 440. For this purpose, the cloud DNS service 411 as well as a load balancer 412 and subsequent components 413-415 are utilized. MTLS activation is used between services (Only clients that have the certificates can communicate with the server) and certificates for the front end. A dynamic Secret Management Engine is implemented so that the development team does not manage credentials and passwords, but injects them as needed. The Time-Series Database also monitors metrics on the infrastructure. Monitoring happens at the worker nodes (EC2 instance) level and the container orchestration level.

Figure 6:
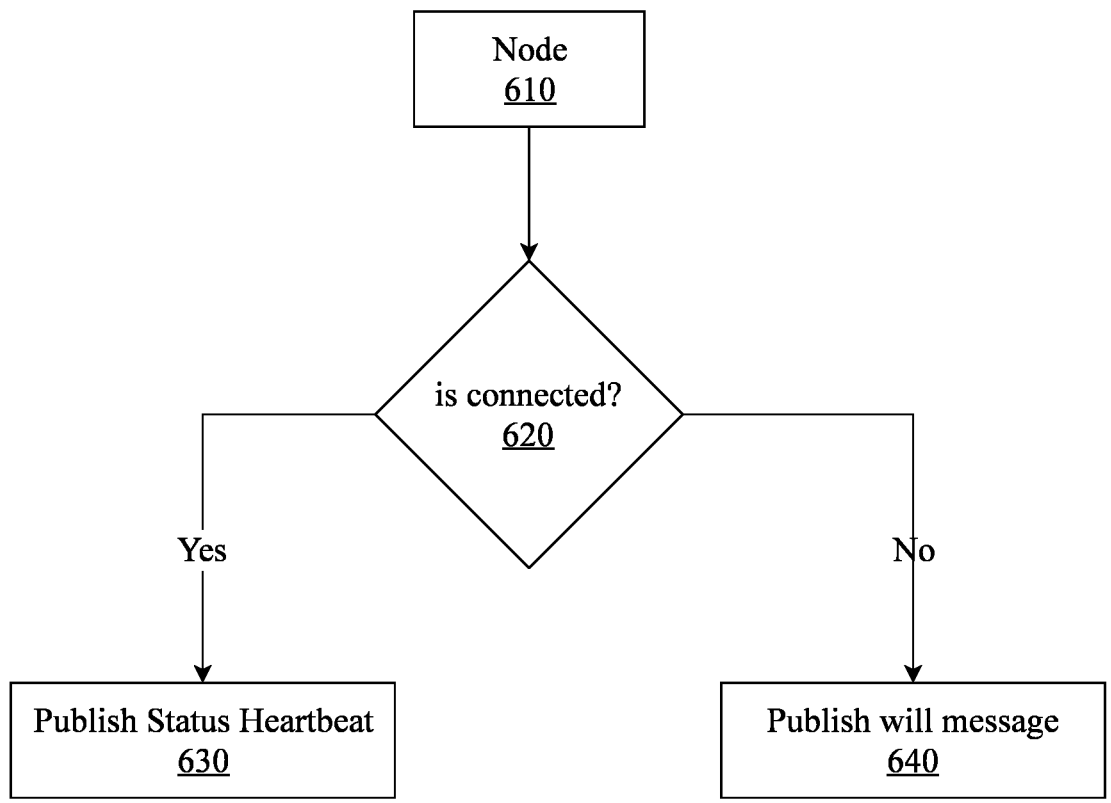
FIG. 6 is a flow diagram illustrating a first exemplary aspect for a node discovery service, according to one aspect.
Figure 7:
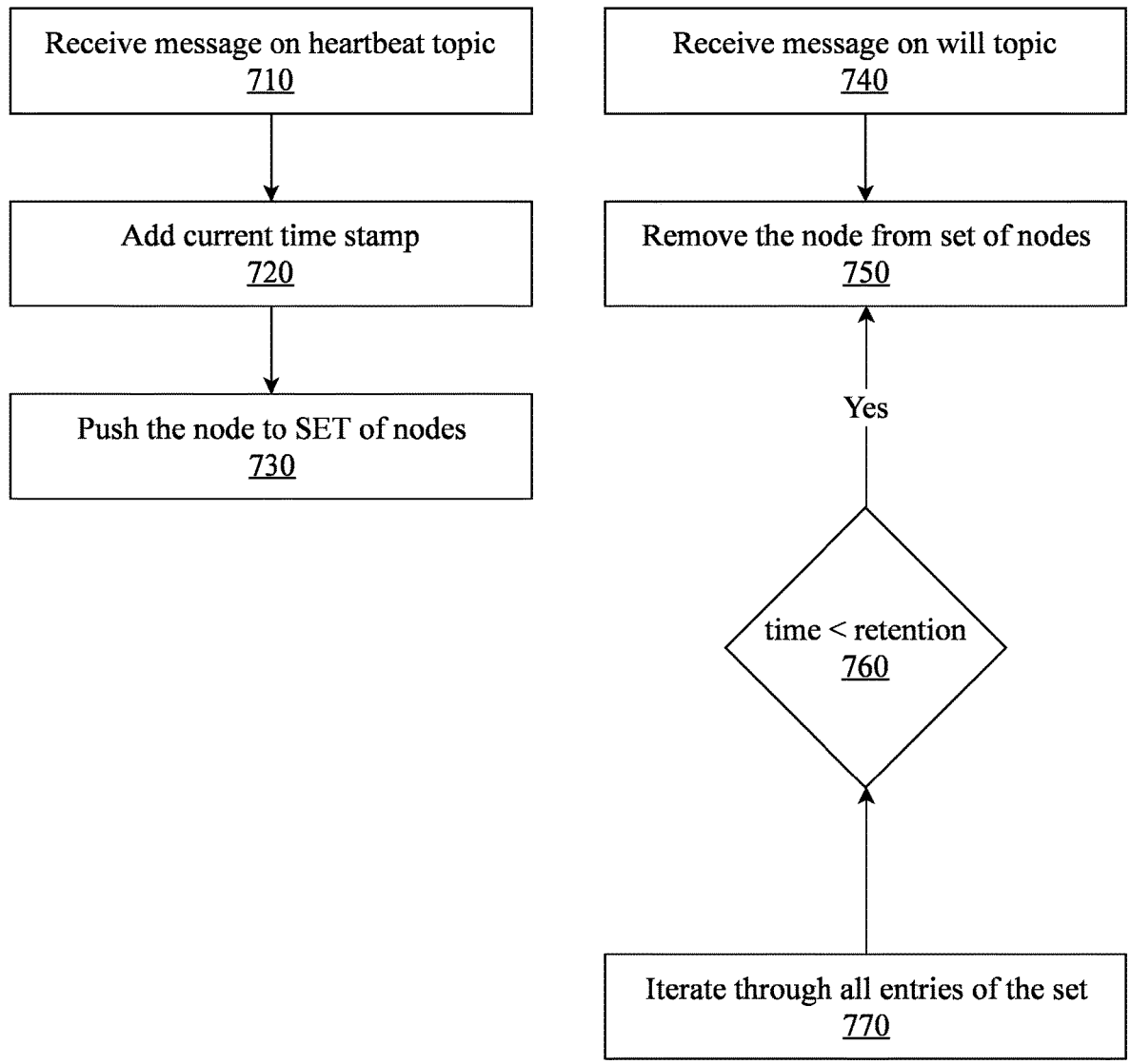
FIG. 7 is a flow diagram illustrating a second exemplary aspect for a node discovery service, according to one aspect.

Within the cloud infrastructure 410, logs are intercepted of ongoing services and then forwarded to the dashboard. A log aggregator reads the logs to the containers. The image service 417 gets the list of available images/tags from the Docker repository and stores and manages images as modules. The Node Manager Service 419 manages all information about all nodes 610 as seen in FIG. 6 and FIG. 7, query functionality for finding organization/users/groups, and maintains the most recently deployed manifest on each node. A Service authentication 418 manages users, organizations, groups, and role-based access management, authentication, and authorization management. The manifest Service 420 manages storage and management of all pipelines in the form of the manifest, and deploys pipelines in the form of manifest files and manage their versions. Lastly, the Discovery Deployment Service 421 provides an endpoint for deploying manifests, maintains the manifest deployment status 620 on all nodes and redeploys if the deployment fails in collaboration with the Node Discovery Service 419, stores a volatile list of all available nodes with any relevant information 640, and receives so-called "heartbeats" of the nodes and update the discovery list 630. For example, FIG. 7 is a flow diagram illustrating a second exemplary aspect for a node discovery service, according to one aspect. If a message is received on a heartbeat topic 710, a timestamp for the current datetime may be added 720, before publishing and pushing the node to the SET of nodes 730. On the other hand if a message is published on a "will" topic 740, such as a for a node that is not connected and sending heartbeat messages actively as seen in FIG. 6, the node will be removed from the set of nodes 750. This removal 750 may also occur if, after a regularly scheduled or discretely triggered iteration through all nodes in the current set 770, their timestamps go beyond the desired retention time period 760.

Detailed Description of Exemplary Aspects

FIG. 1 is a block diagram illustrating an exemplary security architecture for processors, according to one aspect. The security architecture is a hardware assisted security technology that compartmentalizes the whole system into two-parts. The less privileged non-trusted component, known as the "Normal World" 101, is where general purpose application firmware 103 and business logic 104 runs. The privileged "Secure World" 102 has a minimal computing base (so that it should have fewer bugs) and cannot be accessed directly from the general-purpose "Normal World", except for a selection of allowed service calls. Both the "normal world" 101 and "secure world" 102 may have their own separate logical or physical peripherals 108, memory 109, and CPU resources 110, enabling the operation of secure services 105, firmware 106, and business logic or data hosting 107 for the secure world 102. Peripherals 108 may include a user interface or monitor, which may show data regarding real-time attestation of devices and data to users or administrators.

Almost all low level embedded software and firmware is developed in the C programming language. C's lack of proper boundary checks for intended allocated memory is a source of significant security threats. In addition to buffer overflow, C-program suffers from integer-overflow, string-format vulnerability, return address overwrites, etc. There is also a new class of security threats to a C-program such as return-to-libc, and more general return-oriented programming (ROP) which are highly effective against common mitigation techniques such as Data Execution Prevention and code signing. Proper code review with static and dynamic application security tools may reduce the severity of such vulnerabilities. Other techniques in the toolchain such as stack smashing-protection, in the hardware itself like NX-bit set for data segments, during runtime like address space layout randomizations (ASLR) exist. But the program is still far from a fair vulnerability free guarantee. In the context of microcontroller based low-end devices, the most effective mitigation technique of ASLR is not implemented because of practicality to avoid having a run-time loader.

To address C-program vulnerability issues, a system and method to detect them at run time is disclosed. According to one embodiment, a more privileged isolated guard process that inspects and testifies the behavior of a running C-program (the MCU firmware) is used. The guard process needs to be isolated and more privileged than the normal firmware because if it is part of the same process or similar privilege level as normal firmware, the hacker will be able to hack the guard process as well with exploiting the same vulnerability in normal firmware. Furthermore, a remote attestation entity that knows in advance all the valid execution snapshots of normal firmware execution, and testifies to these snapshots periodically is utilized. A remote server for attestation may also be used to make the overall system more resilient to attacks, rather than relying on an isolated guard process. The remote server also lets the device fleet manager know the integrity status of the devices.

While ARM processors and C code is used to present various embodiments, it is known that the system and method disclosed herein may be implemented across software and hardware domains not limited to ARM processors and C code.

Figure 10:
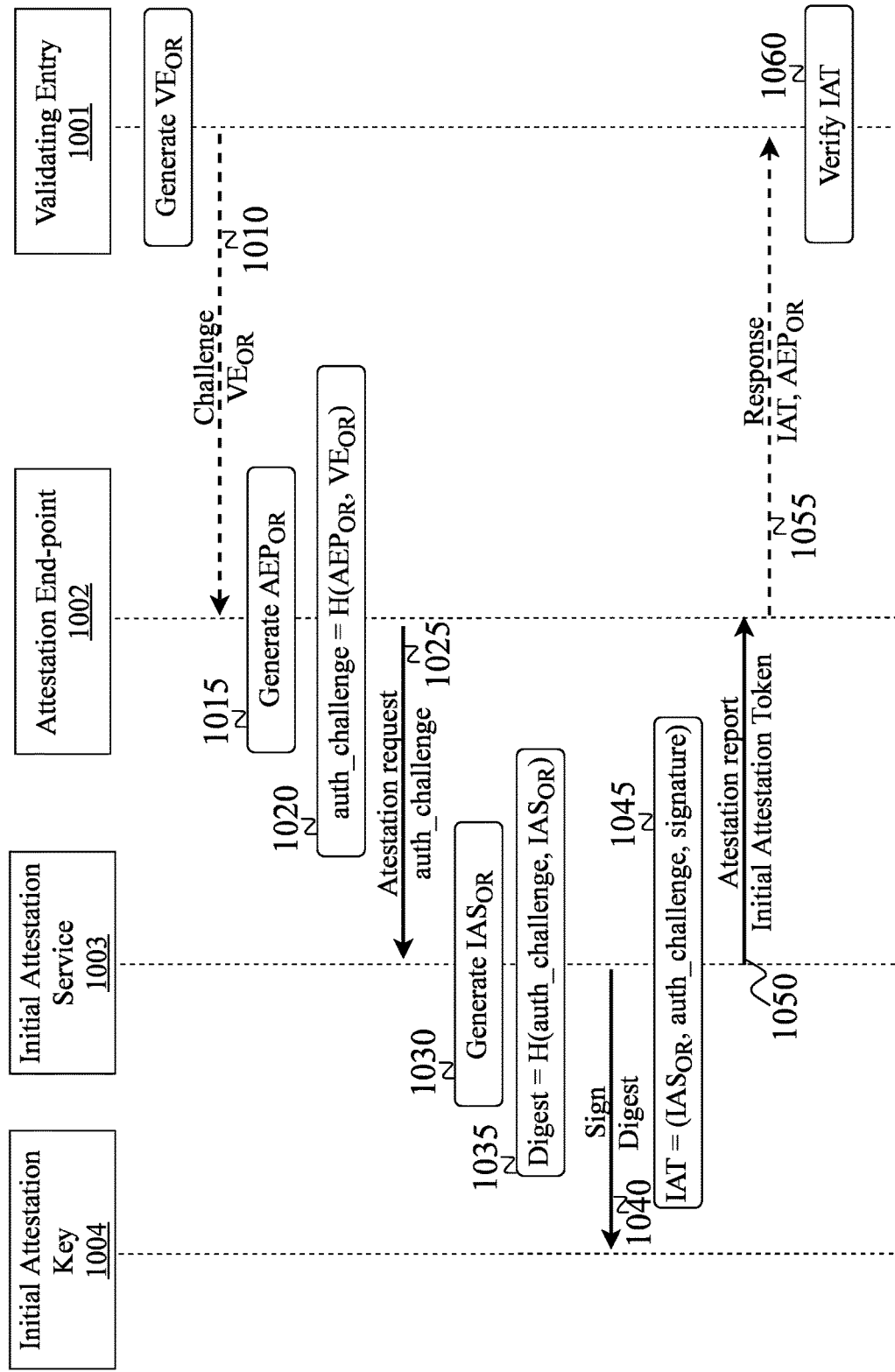
FIG. 10 is a flow diagram illustrating an exemplary method for remote attestation, according to one aspect.

FIG. 10 is a flow diagram illustrating an exemplary method for remote attestation, according to one aspect. According to various embodiments, a generic attestation protocol is disclosed. A Runtime Profiler tool, which runs several times with different inputs for an entire program, captures and stores a set of golden hashes. A single golden hash represents a valid execution path of the entire program for a specific input. This may differ from a hash of a single Control-Flow-Information tuple, which may be characterized as: "sourceAddress, originalDestinationAddress", as one example.

All Golden Hashes with the corresponding program inputs are stored in a database on a remote attestation server, in the Golden Hash Table. A remote attester server prompts a remote device running protected firmware to control the flow and integrity of data, optionally for a given program input. The Trusted Application running on a device prepares a device-specific, cryptographically signed, authenticated response with the latest calculated Control Flow Golden hash, as shown in this diagram.

After receiving the device's response, the server checks the Remote Attester server to see if the Golden Hash matches one of the available hashes from the Golden Hash Branch Table. If the health check fails, the subscriber parties are notified to take action against the device. Depending on the severity of the application case used, these actions can be as simple as rejecting all data coming from the device to forcibly update the firmware on the device.

More specifically, the validation entity (VE) 1001 challenges 1010 the Attestation End Point 1002 that is providing metadata in the object record $VE_{OR}$. The AEP 1002 requests an Initial Attestation Token (IAT) 1015, 1020, 1025 from the Initial Attestation Service 1003, providing at least the metadata that must be validated by the VE for the chosen scheme 1030. Typically, this will be a cryptographic hash of the AEP-specific data in the object record $AEP_{OR}$, and $VE_{OR}$. This is shown as denoted H ($AEP_{OR}$, $VE_{OR}$) 1035. The Initial Attestation Key 1004 is used to sign 1040 a cryptographic hash of the data from the AEP and $IAS_{OR}$. Once signed using the IAK 1004, it is returned to the AEP 1002, 1050. This is the Initial Attestation Token 1045. Typically, these will be encoded in a standard form, for example the IETF Entity Attestation Token. The challenge is then completed by the AEP 1002 returning the signed IAT 1003 and its object record $AEP_{OR}$ to the validation entity 1055. The VE can use the returned data to validate: the trustworthiness of the PSA Root of Trust and its implementation; the authenticity of the Object Record $AEP_{OR}$; and the context of the original validating entity challenge data $VE_{OR}$ 1060.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
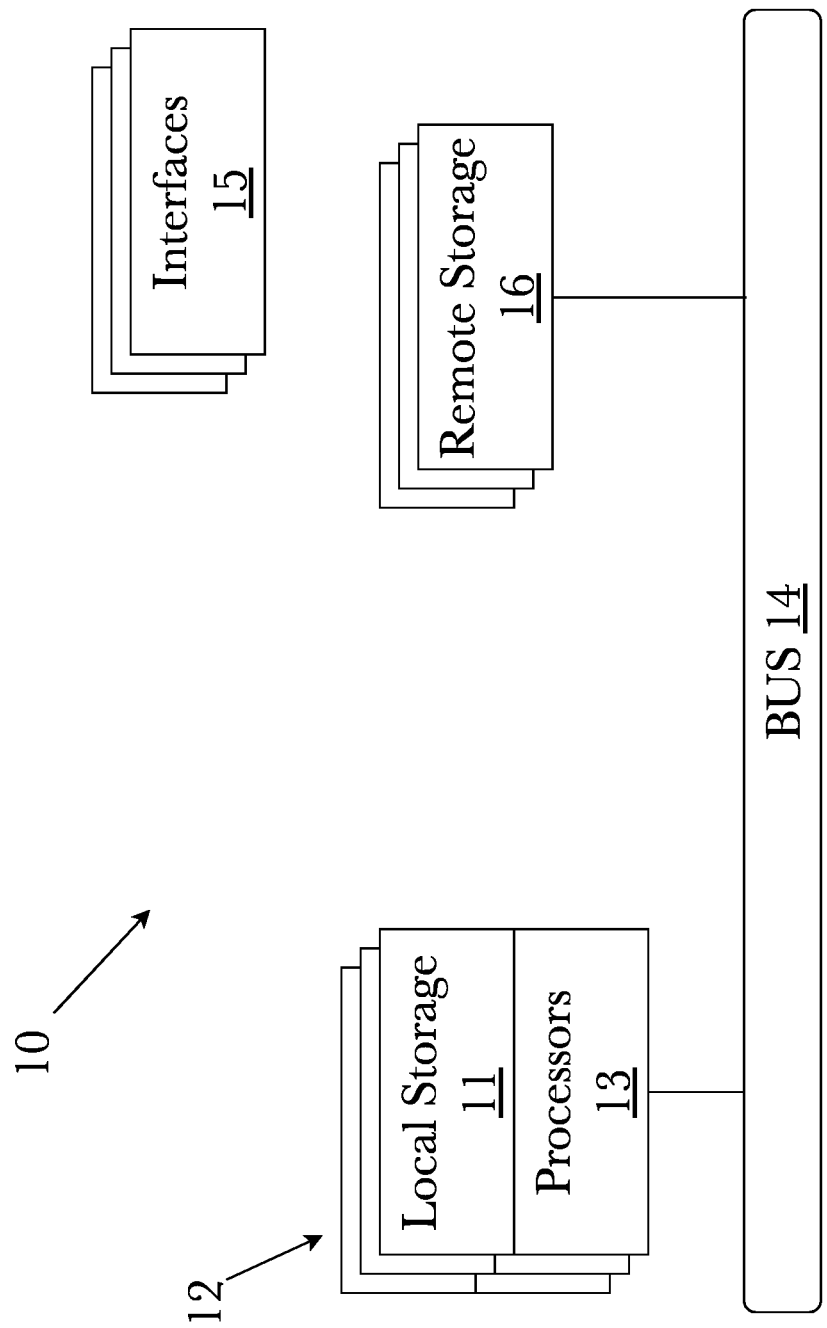
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
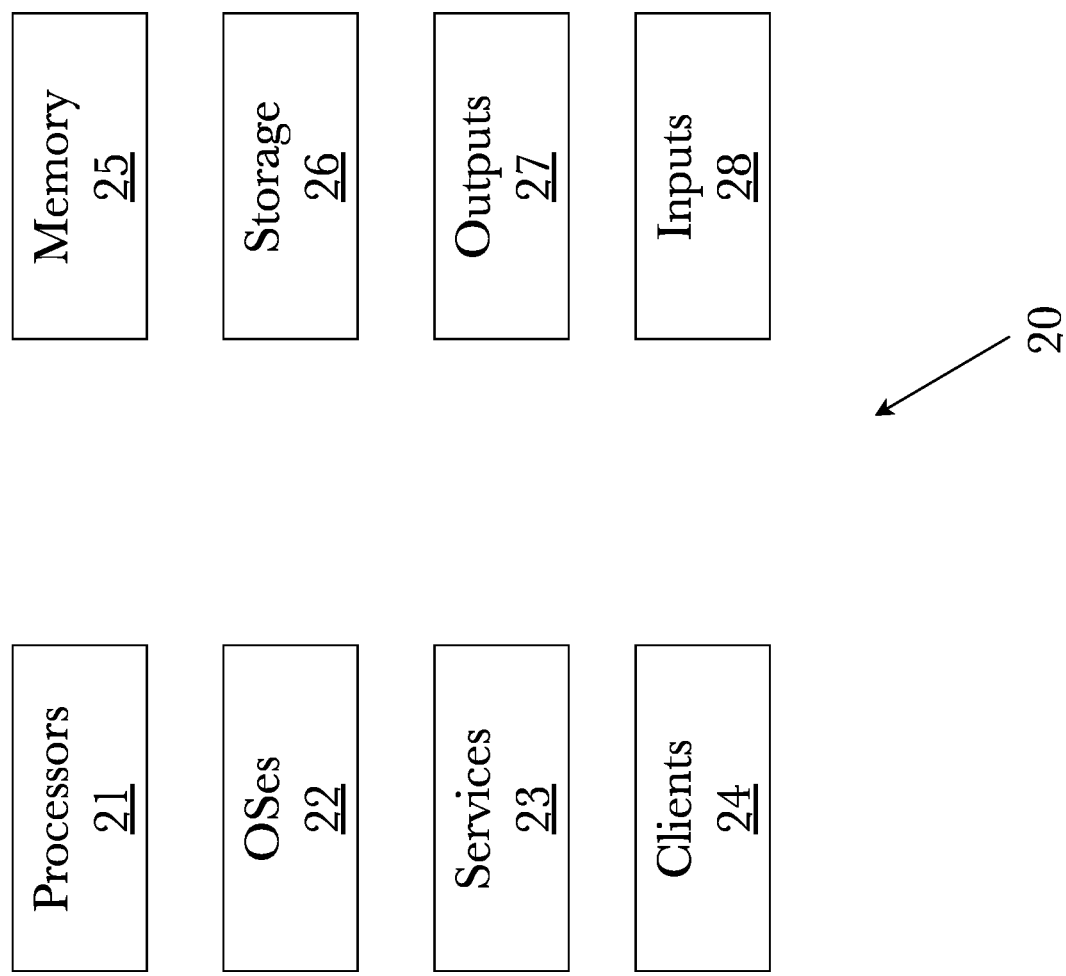
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
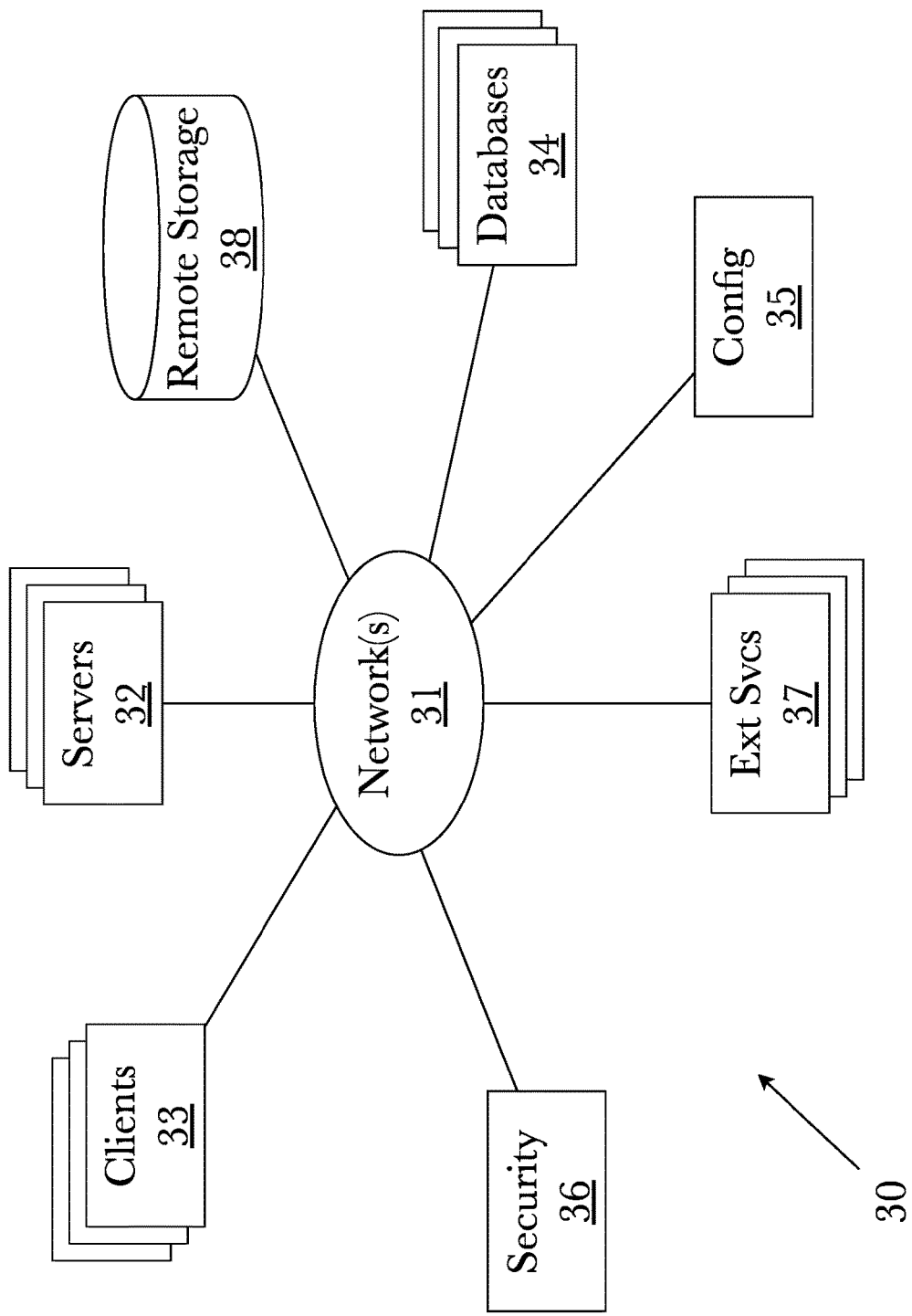
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
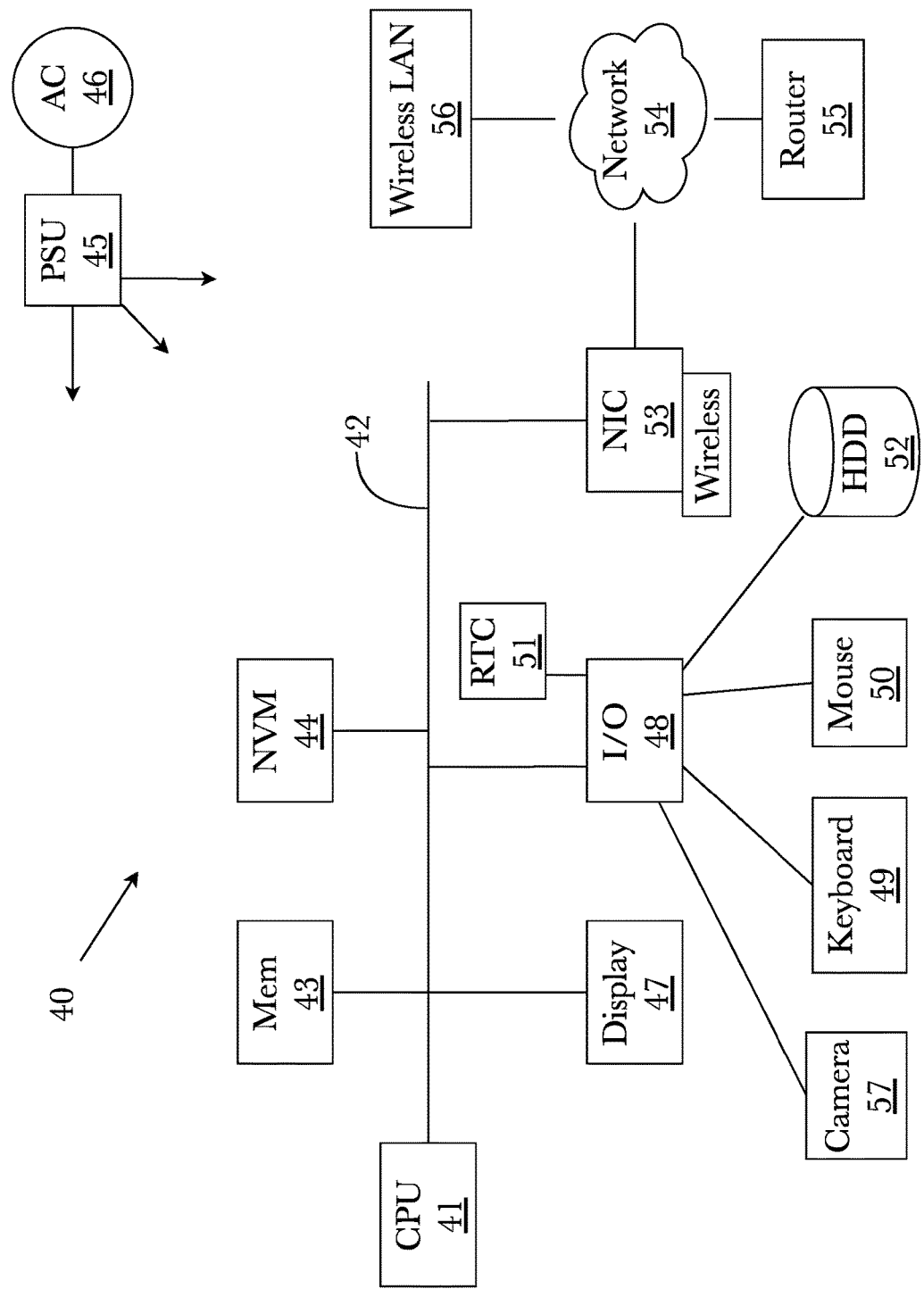
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for end-to-end data trust management with real-time attestation, comprising:
a database, wherein the database comprises a plurality of verified control flow hash values;
a first networked computing device comprising a firmware memory, a processor, and an instrumented firmware stored in the firmware memory and operable on the processor, the instrumented firmware comprising a first plurality of programming instructions that, when operating on the processor, causes the first networked computing device to:
create a compartmentalized normal operating environment;
create a compartmentalized high-privileged operating environment;
create a golden hash value from a set of instructions running in the normal operating environment on the processor of the networked computing device; and
send the golden hash value to a trusted guard application;
wherein the trusted guard application is executed in the high-privileged operating environment of the first networked computing device;
wherein the trusted guard application:
prepares a device-specific cryptographically-signed authenticated message with the golden hash value; and
sends the device-specific cryptographically-signed authenticated message to a remote attestation server; and
the remote attestation server comprising at least a second plurality of programming instructions stored in a memory of, and operating on at least one processor of, a second networked computing device, wherein the second plurality of programming instructions, when operating on the at least one processor, causes the second networked computing device to:
receive the golden hash value from the first networked computing device via the device-specific cryptographically-signed authenticated message; and
validate the integrity of the golden hash against at least one of the plurality of verified control flow hash values stored in the database.

2. The system of claim 1, further comprising an application programming interface.

3. The system of claim 2, wherein the trusted guard application passes data packets to the remote attestation server via the application programming interface.

4. The system of claim 1, wherein the instrumented firmware is implemented using containers.

5. The system of claim 1, wherein a failed validation of the golden hash value results in an alert.

6. The system of claim 1, further comprising a user interface that displays real-time attestation data.

7. The system of claim 1, wherein the golden hash value is generated from all the instructions between two branch instructions.

8. The system of claim 1, wherein the first networked computing device comprises any computing device with a processor that is communicatively coupled to another computing device.

9. The system of claim 1, further comprising a secure messaging establishment protocol.

10. The system of claim 9, wherein the secure messaging establishment protocol uses a third-party mediator to verify network activity.

11. A method for end-to-end data trust management with real-time attestation, comprising the steps of:
storing a plurality of verified control flow hash values in a database;
in a networked computing device comprising a firmware memory, a processor, and an instrumented firmware stored in the firmware memory and operable on the processor:
creating a compartmentalized normal operating environment on the processor;
creating a compartmentalized high-privileged operating environment on the processor;
creating a golden hash value from a set of instructions running in the normal operating environment on the processor; and
sending the golden hash value to a trusted guard application running in the high-privileged operating environment of the processor;
in the trusted guard application:
preparing a device-specific cryptographically-signed authenticated message with the golden hash value;
sending the device-specific cryptographically-signed authenticated message to a remote attestation server; and
validating, at the remote attestation server, the integrity of the golden hash value against at least one of the plurality of verified control flow hash values stored in the database.

12. The method of claim 11, further comprising an application programming interface.

13. The method of claim 12, wherein the trusted guard application and the remote attestation server pass data packets via the application programming interface.

14. The method of claim 11, wherein the instrumented firmware is implemented using containers.

15. The method of claim 11, wherein a failed validation of the golden hash value results in an alert.

16. The method of claim 11, further comprising a user interface that displays real-time attestation data.

17. The method of claim 11, wherein the golden hash value is generated from all the instructions between two branch instructions.

18. The method of claim 11, wherein the networked computing device comprises any computing device with a processor that is communicatively coupled to another computing device.

19. The method of claim 11, further comprising a secure messaging establishment protocol.

20. The method of claim 19, wherein the secure messaging establishment protocol uses a third-party mediator to verify network activity.

* * * * *